United States Patent [19]

Furumura et al.

[11] Patent Number: 5,666,287

[45] Date of Patent: Sep. 9, 1997

[54] QUENCH-HARDENING TESTING METHOD AND APPARATUS

[75] Inventors: Kyozaburo Furumura; Masayuki Kobayashi, both of Kanagawa, Japan

[73] Assignee: NSK Ltd., Tokyo, Japan

[21] Appl. No.: 370,812

[22] Filed: Jan. 10, 1995

Related U.S. Application Data

[63] Continuation of Ser. No. 12,771, Feb. 3, 1993, abandoned.

[30] Foreign Application Priority Data

Feb. 7, 1992 [JP] Japan .................... 4-022757

[51] Int. Cl.[6] .................................................. C21D 1/55
[52] U.S. Cl. .................. 364/507; 364/563; 73/760; 148/510
[58] Field of Search ................ 148/510; 266/99; 73/760, 783, 866; 364/552, 506, 507, 560, 563; 378/54, 58, 59

[56] References Cited

U.S. PATENT DOCUMENTS

| | | | |
|---|---|---|---|
| 3,948,090 | 4/1976 | Berman et al. | 73/760 X |
| 4,050,963 | 9/1977 | Kunioka et al. | 148/510 |
| 4,636,969 | 1/1987 | Kyoden et al. | 364/560 |
| 4,755,952 | 7/1988 | Johns | 364/507 X |
| 4,918,627 | 4/1990 | Garcia et al. | 364/552 |
| 5,042,055 | 8/1991 | Wirt et al. | 378/58 |
| 5,046,111 | 9/1991 | Cox et al. | 364/552 X |
| 5,146,416 | 9/1992 | Kuo | 364/552 X |
| 5,379,237 | 1/1995 | Morgan et al. | 364/507 |
| 5,414,648 | 5/1995 | Morgan et al. | 364/563 |
| 5,433,800 | 7/1995 | Bishop | 148/510 |

FOREIGN PATENT DOCUMENTS

| | | |
|---|---|---|
| 41-2435 | 2/1966 | Japan . |
| 53-32054 | 3/1978 | Japan . |
| 223827 | 5/1990 | Japan . |

*Primary Examiner*—Emanuel T. Voeltz
*Assistant Examiner*—Eric W. Stamber
*Attorney, Agent, or Firm*—Sughrue, Mion, Zinn, Macpeak & Seas

[57] ABSTRACT

It is an object of the present invention to provide a quench-hardening testing method in which the quench-hardened depth of a quench-hardened layer and the quench-hardening pattern in inner and outer circumferential surfaces of hollow and solid parts can be measured through non-destructive inspection. A quantity of change in size, between before and after quench-hardening, of a hollow or solid member subjected to quench-hardening treatment in at least one of inner and outer circumferential surfaces of the member is measured, and the measured quantity of change is compared with a pre-measured quantity of change in size of a good member or a value obtained by a comparative calculating operation in accordance with a predetermined algorithm on the basis of the measure quantity of change is compared with a predetermined value of the good member to thereby judge the state of quench-hardening. Thus, even in the case of parts complicated in shape or even in the case of small size hollow parts, the quench-hardened depth of a quench-hardened layer and the quality of the quench-hardening pattern of the parts can be measured through non-destructive inspection.

6 Claims, 8 Drawing Sheets

QUENCH-HARDENED PORTION d = 1∼2.5mm
GOOD PRODUCT
(DEPTH OF QUENCH-HARDENED LAYER)

Dq : OUTER SIZE AFTER QUENCH-HARDENING
Do : OUTER SIZE BEFORE QUENCH-HARDENING d : QUENCH-HARDENED DEPTH
t : THICKNESS
Do : OUTER SIZE BEFORE QUENCH-HARDENING
ΔD : QUANTITY OF CHANGE OF OUTER SIZE (Dq-Do)
Dq : OUTER SIZE AFTER QUENCH-HARDENING d : QUENCH-HARDENED DEPTH
t : THICKNESS
Do : OUTER SIZE BEFORE QUENCH-HARDENING
ΔD : QUANTITY OF CHANGE OF OUTER SIZE (Dq-Do)
Dq : OUTER SIZE AFTER QUENCH-HARDENING

QUENCH-HARDENING TESTING METHOD AND APPARATUS

This is a Continuation of application Ser. No. 08/012,771, filed Feb. 3, 1993, now abandoned.

BACKGROUND OF THE INVENTION

The present invention relates to a method and an apparatus of testing quench-hardening, and particularly relates to a method of testing quench-hardening suitable for non-destructive inspection of quench-hardened depth or a quench-hardening pattern of a hollow or solid member subjected to an induction hardening (high-frequency quench-hardening) treatment in at least one of inner and outer circumferential surfaces of the member.

Generally, hollow or solid parts such as inner and outer wheels of hub units, outer races and inner races of constant velocity joints, shafts for cars, and so on, are subjected to surface quench-hardening with high-frequency energy.

As the method of testing the degree of the quench-hardening, the following methods are known:

(1) A method in which a change in the macro structure of steel due to quench-hardening is detected as a change in magnetic characteristics to thereby estimate the quench-hardened depth (Japanese Patent Examined Publication No. Sho-41-2435);

(2) A method in which a change in the macro structure of steel is detected as a change in sound velocity of a ultrasonic wave to thereby estimate the quench-hardened depth (Japanese Patent Unexamined Publication No. Sho-53-32054); and so on.

Further, as a method of estimating the quench-hardened depth while parts are being heated, the following methods are known:

(3) Thermal expansion of heated parts which are being subjected to quench-hardening is measured to thereby determine the quench-hardened macro structure (Japanese Patent Examined Publication No. Hei-2-23827).

Of the above conventional quench-hardening testing methods, the methods (1) and (2) are limited in that the estimation can be performed only on the quench-hardening in the outer circumferential surfaces of parts which are simple in shape and those methods cannot be applied to the quench-hardening estimation in the case where the parts are complicated in shape or in the case where the quench-hardening test is to be performed on the inner circumferential surfaces of hollow parts. The method (3), on the other hand, is limited in that it cannot be applied to the quench-hardening depth estimation on parts after cooling while it is effective in monitoring a quench-hardening heat treatment (particularly, a temperature of the quench-hardening and a holding time). Further, there is a problem that the depth distribution of a quench-hardened layer cannot be measured.

SUMMARY OF THE INVENTION

In view of the above points, it is an object of the present invention to provide a quench-hardening testing method and apparatus in which the quench-hardened depth of a quench-hardened layer and the quench-hardening pattern in inner and outer circumferential surfaces of hollow and solid parts can be measured through non-destructive inspection.

In order to solve the above problems, in the method of testing quench-hardening according to the present invention, a quantity of change in size, between before and after quench-hardening, of a hollow or solid member subjected to quench-hardening treatment in at least one of inner and outer circumferential surfaces of the member is measured, and a value obtained on the basis of the measured quantity of change is compared with a predetermined value of a standard member quench-hardened, in a known manner so as to judge the state of quench-hardened depth.

Thus, even in the case of parts complicated in shape or even in the case of hollow parts, the quench-hardened depth of a quench-hardened layer and the quality of the quench-hardening pattern of the parts can be measured through non-destructive inspection.

The comparing process of the present invention may be a direct comparing process in which the measured quantity of change is directly compared with a pre-measured quantity of change in size of the standard member.

The comparing process of the present invention may be an indirect comparing process wherein a value obtained by a comparative calculating operation in accordance with a predetermined algorithm on the basis of the measure quantity of change is compared with a predetermined value of the standard member.

The surfaces (inner and outer circumferential surfaces) of parts are expanded by martensite transformation generated therein by induction hardening (high-frequency quench-hardening), so that the size of each part changes at various portions thereof between before and after the quench-hardening. The quantity of this change in size is measured by means of a contact-type size measuring instrument such as a dial gauge or an optical-type non-contact size measuring instrument and the thus measured value is compared with a quantity of change in size of good parts measured in advance.

At this time, the two quantities of change in size may be compared with each other directly or through application of a suitable algorithm (for example, calculation of the rate of change in volume or calculation of the quantity of distortion) to each of the measured sizes. By making a judgement on the comparison value on the bases of a proper working curve, it is possible to judge the quality of quench-hardening depth in the parts to be measured.

DETAILED DESCRIPTION OF THE PREFERRED EMBODIMENTS

In the following, the present invention will be described on the basis of an embodiment illustrated in the accompanying drawings.

Figure 1:
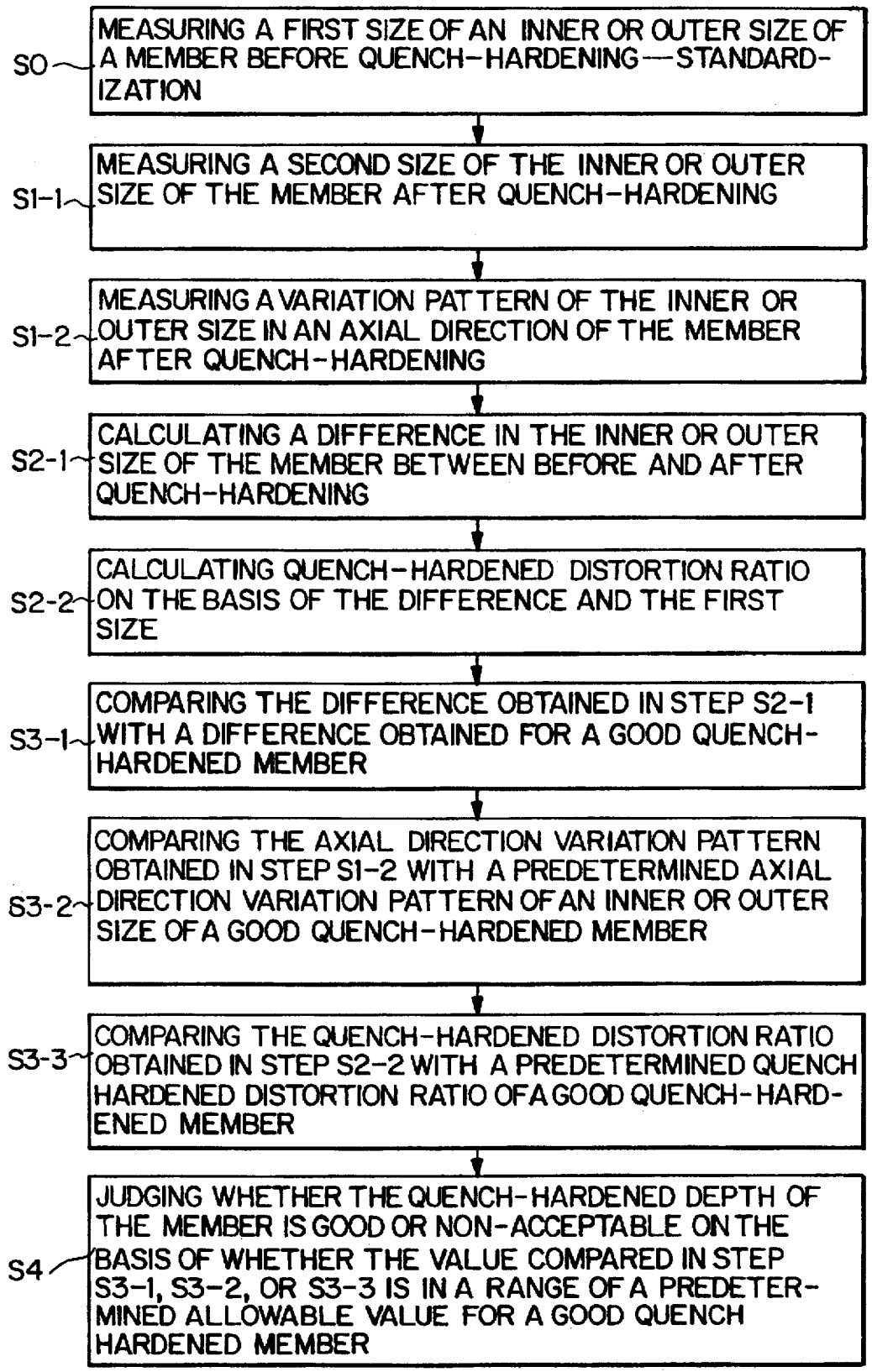
FIG. 1 is a flow chart of the quench-hardening testing method according to the present invention.
Figure 2:
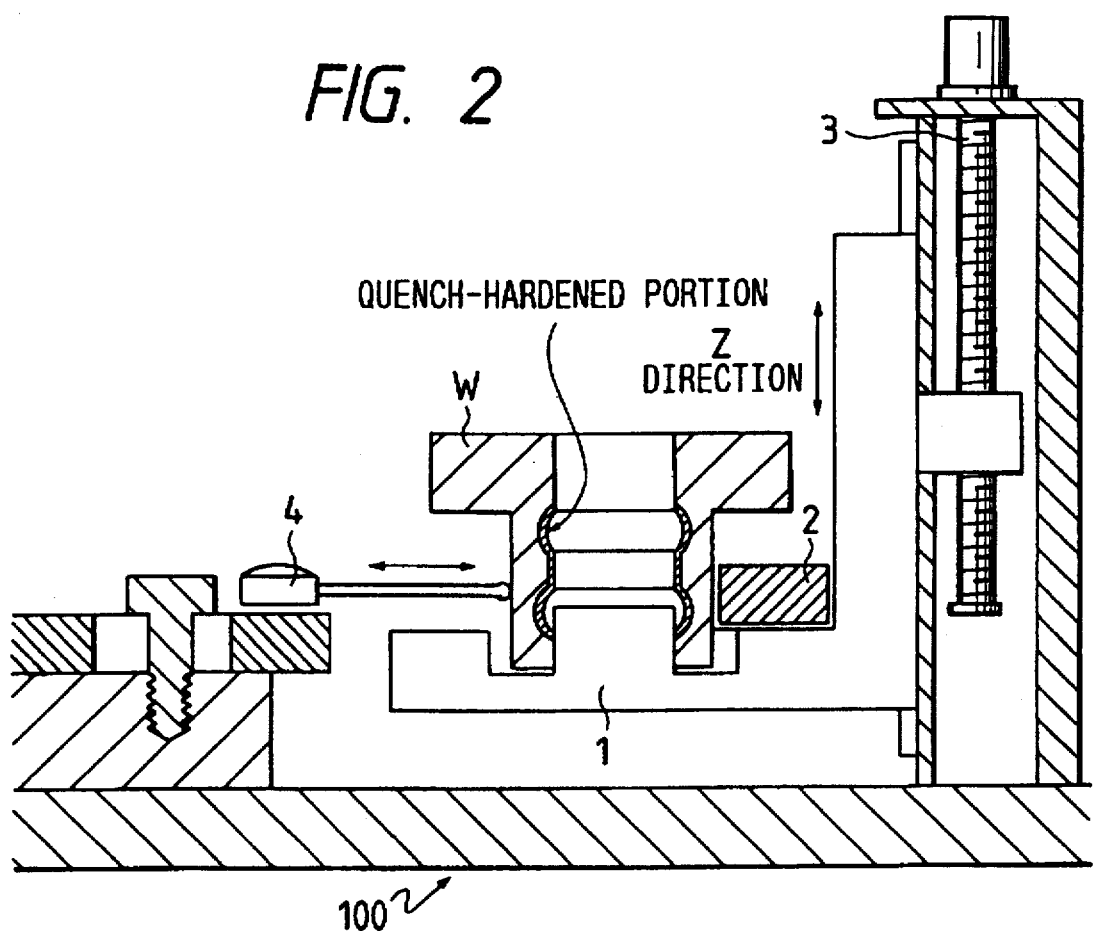
FIG. 2 is a sectional view showing an example of the outer size measurement apparatus in the quench-hardening testing method according to the present invention.
Figure 3:
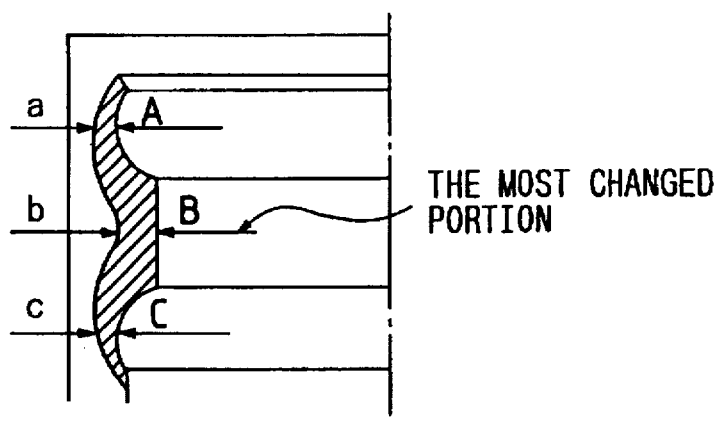
FIG. 3 is a sectional view showing an example of the quench-hardened layer of a cylindrical member.
Figure 4:
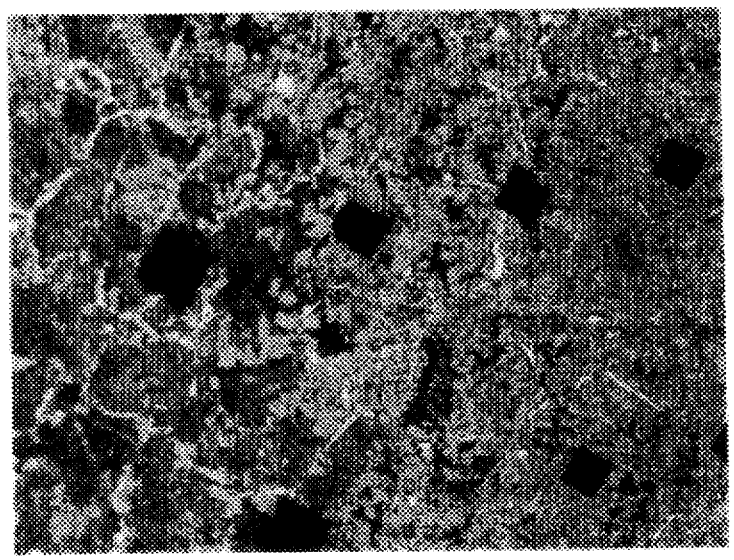
FIG. 4 is a view (explanatory view based on photograph) showing vicinity of a boundary layer of the quench-hardened layer of the member of FIG. 3.
Figure 5:
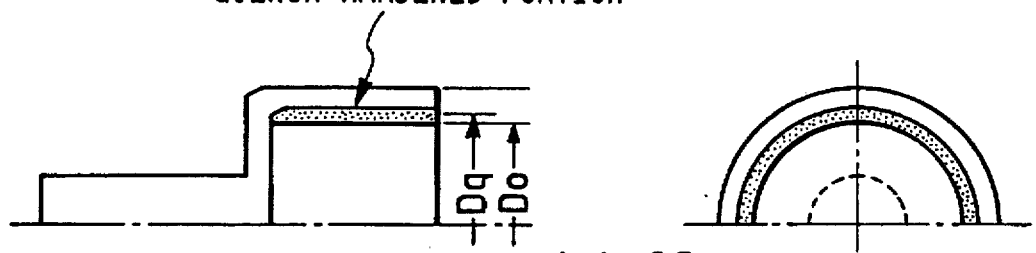
FIG. 5 is a sectional view showing an example in which quench-hardening is made in the inner circumferential surface of cup-like parts.
Figure 6:
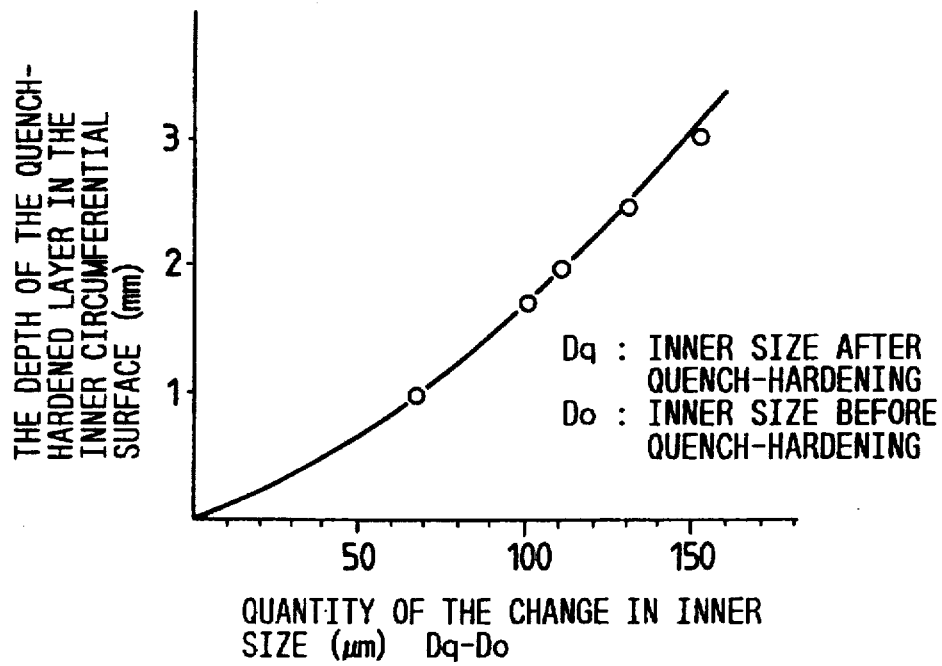
FIG. 6 is a characteristic graph view showing a relation between the depth of the quench-hardened layer in the inner circumferential surface and the quantity of the change in inner size of FIG. 5.
Figure 7:
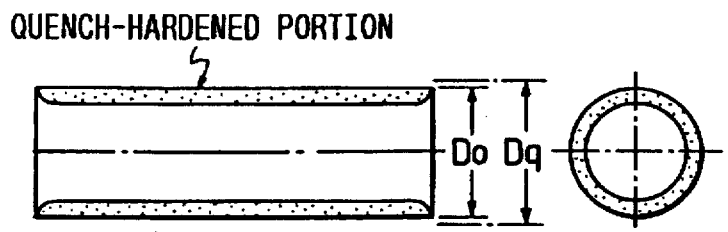
FIG. 7 is a sectional view showing an example in which quench-hardening is made in the outer circumferential surface of shaft-like parts.
Figure 8:
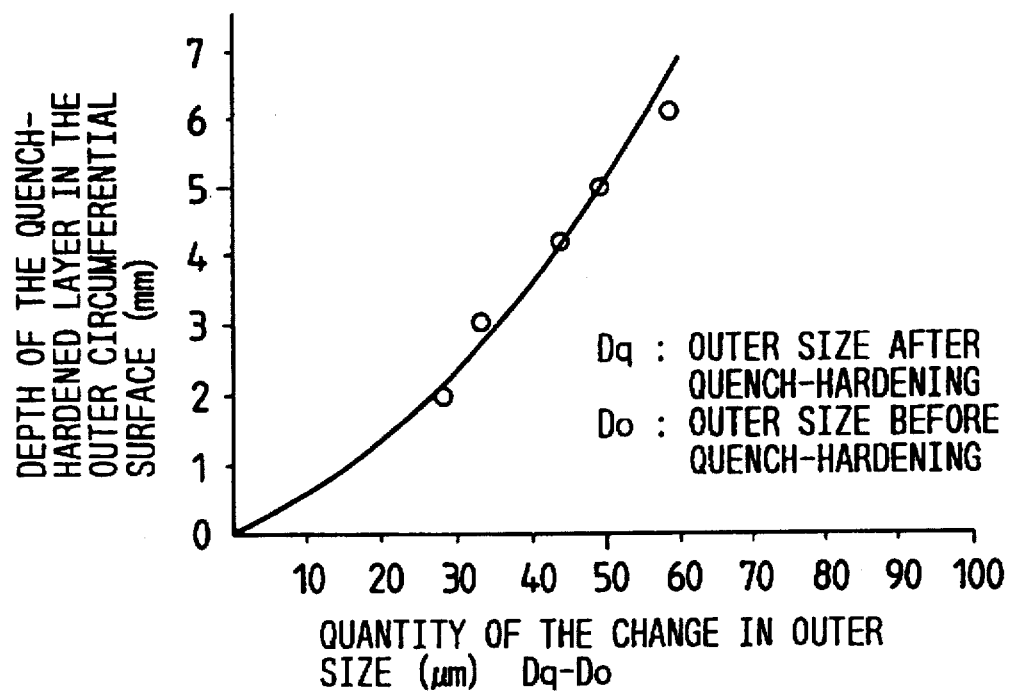
FIG. 8 is a characteristic graph view showing a relation between the depth of the quench-hardened layer in the outer circumferential surface and the quantity of the change in outer size of FIG. 7.
Figure 9:
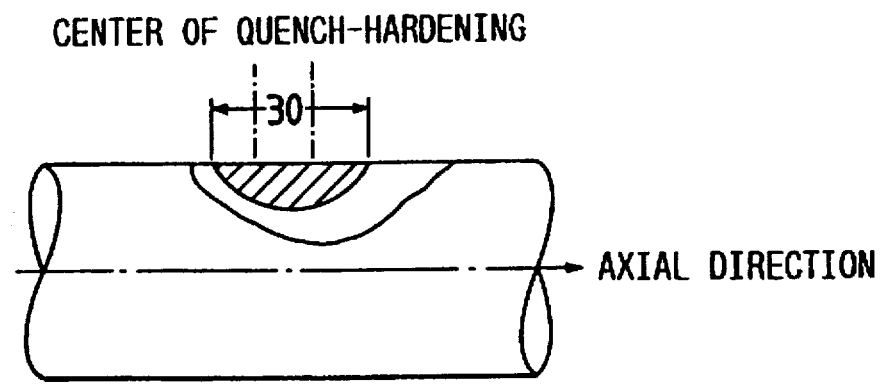
FIG. 9 is a sectional view showing an example of partial quench-hardening in an outer circumferential surface.
Figure 10:
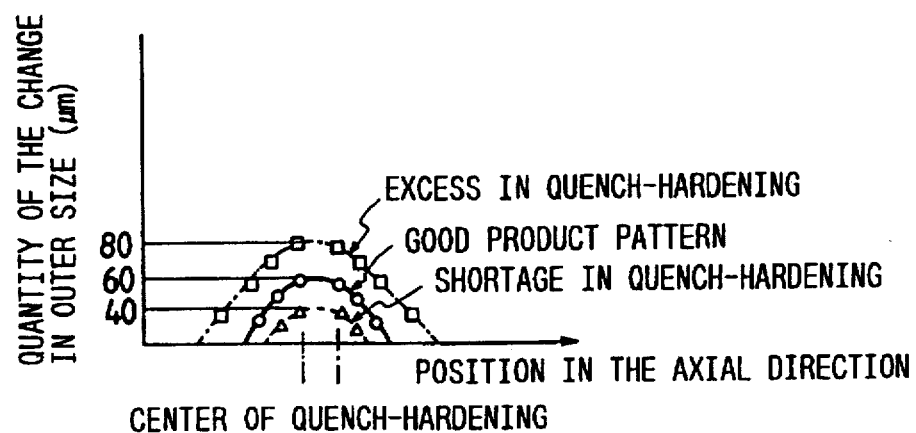
FIG. 10 is a characteristic graph view showing a relation between the quench-hardening position and the quantity of the change in outer size of FIG. 9.
Figure 11:
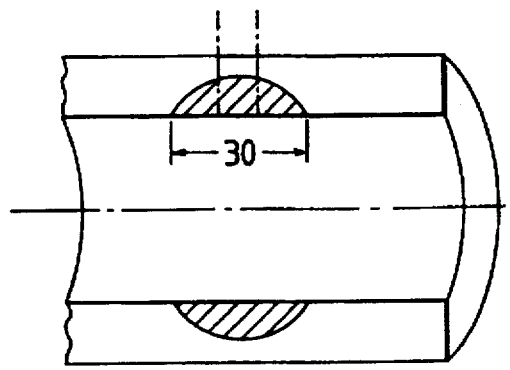
FIG. 11 is a sectional view showing an example of partial quench-hardening in an inner circumferential surface.
Figure 12:
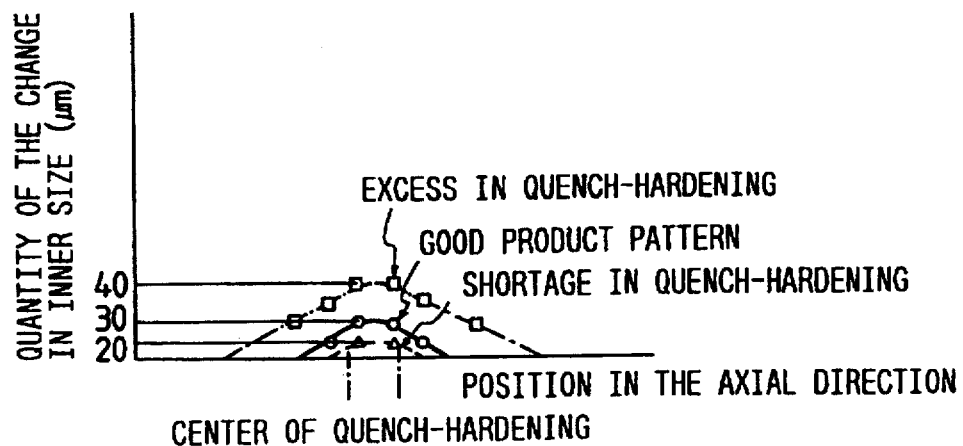
FIG. 12 is a characteristic graph view showing a relation between the quench-hardening position and the quantity of the change in inner size of FIG. 9.
Figure 13:
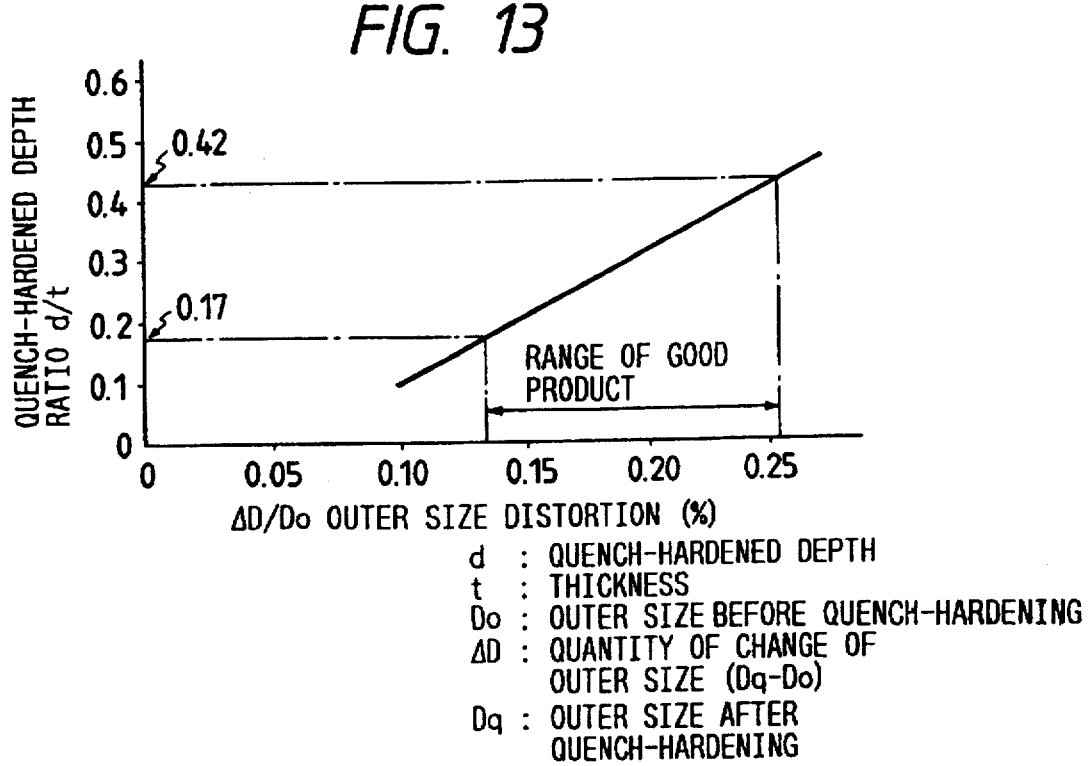
FIG. 13 is a characteristic graph showing a working curve representing the correspondence between the quench-hardened depth ratio and the outer size distortion in cup-like parts of FIG. 5.
Figure 14:
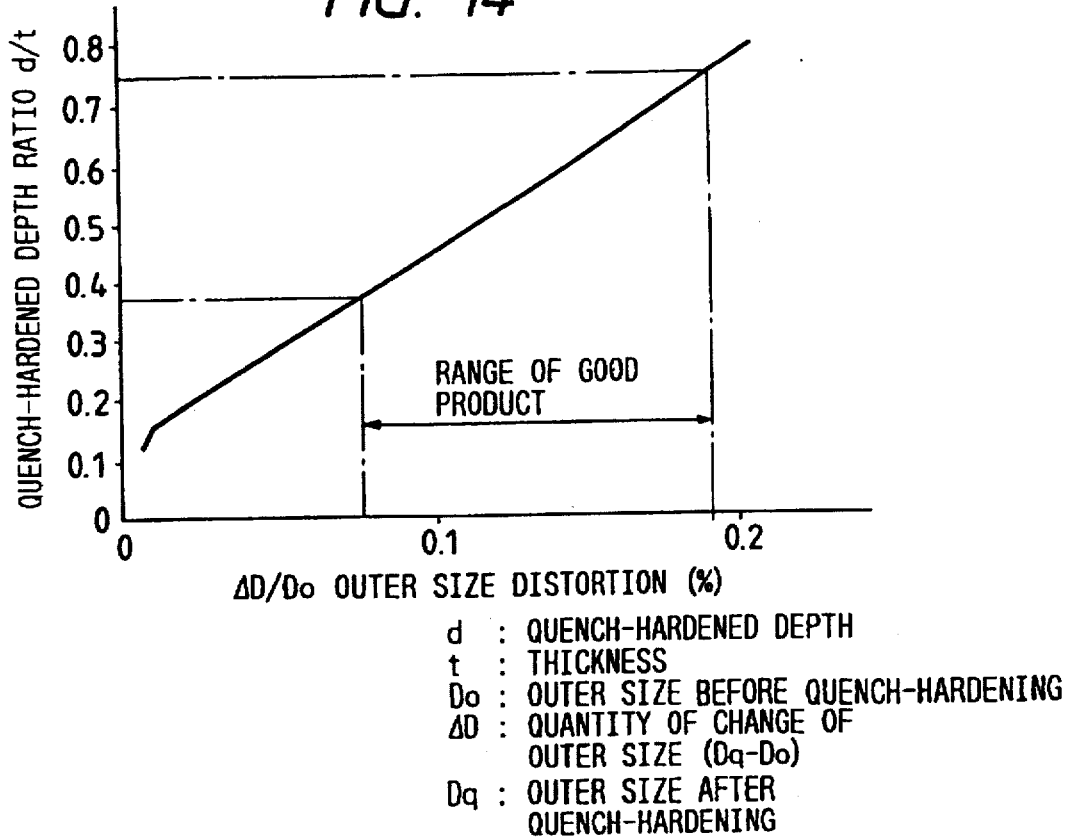
FIG. 14 is a characteristic graph showing a working curve representing the correspondence between the quench-hardened depth ratio and the outer size distortion in shaft-like parts of FIG. 7.

FIG. 1 is a flowchart showing the quench-hardening testing method according to the present invention; FIG. 2 is a sectional view showing an example of the size measurement apparatus suitable for the quench-hardening testing method according to the present invention; FIG. 3 is a sectional view showing an example of the quench-hardened layer of a cylindrical member; FIG. 4 is a view showing vicinity of a boundary layer of the quench-hardened layer of the member of FIG. 3 (explanatory view based on 200-fold magnified photograph; small Vickers indentations scattered in the right-hand 100% martensite macro structure continue to the vicinity of the left-hand matrix boundary and expand suddenly); FIG. 5 is a sectional view showing an example in which quench-hardening is made in the inner circumferential surface of cup-like parts; FIG. 6 is a characteristic graph view showing a relation between the depth of the quench-hardened layer in the inner circumferential surface and the quantity of the change in inner size of FIG. 5; FIG. 7 is a sectional view showing an example in which quench-hardening is made in the outer circumferential surface of shaft-like parts; FIG. 8 is a characteristic graph view showing a relation between the depth of the quench-hardened layer in the outer circumferential surface and thee quantity of the change in outer size of FIG. 7; FIG. 9 is a sectional view showing an example of partial quench-hardening in an outer circumferential surface; FIG. 10 is a characteristic graph view showing a relation between the quench-hardening position and the quantity of the change in outer size of FIG. 9; FIG. 11 is a sectional view showing an example of partial quench-hardening in an inner circumferential surface; FIG. 12 is a characteristic graph view showing a relation between the quench-hardening position and the quantity of the change in inner size of FIG. 11; FIG. 13 is a characteristic graph showing a working curve representing the correspondence between the quench-hardened depth ratio and the outer size distortion in cup-like parts of FIG. 5; and FIG. 14 is a characteristic graph showing a working curve representing the correspondence between the quench-hardened depth ratio and the outer size distortion in shaft-like parts of FIG. 7.

FIG. 2 shows an example of a work-size measurement apparatus 100 suitable for the quench-hardening testing method according to the present invention. Reference numeral 1 designates a work table on which a work W (an object to be worked which is an object to be measured) can be mounted through a positioning jig 2 at a predetermined position and with a predetermined posture (the state in which the central axis is made coincident with the Z-axis). The work table 1 is arranged so as to be moved up/down (in the Z-axis direction) by a ball screw 3 so that the work W can be moves in the Z-axis direction (the up/down direction) when the charge in quench-hardened depth corresponding to the quench-hardening position is to be measured. Here, the work table 1 may be constituted by an index table so that the work table can be rotated around the Z-axis.

The reference numeral 4 designates a dial gauge arranged so as to be horizontally movable toward the central axis of the work, W set on the work table 1. Here, since the position and posture of the work W are defined in advance as described above, the outer size of the work W can be measured accurately only by moving the gauge 4 frontward/rearward.

It is a matter of course that the work-size measurement apparatus 100 may be a contactless-type optical measurement apparatus such as a laser measuring machine or a contact-type multi-point measurement instrument such as a three-dimensional measurement instrument, so long as it is configured so as to be able to measure the outer size of the work W.

By using such a work-size measurement apparatus, it is possible to measure the outer size of a work in a short time and it is therefore possible to perform 100% inspection on line on all the works subjected to quench-hardening. If a change in size between before and after a quench-hardening process is measured in accordance with the flow chart of FIG. 1, it is possible to inspect the quality of quench-hardening.

At first, a first size of an outer or inner size of a hollow or solid member before quench-hardening is measured (step S0). Then, the following steps are carried out:

A second size of the outer or inner size of the member after quench-hardening is measured accurately by means of the work-size measurement apparatus 100 (step S1-1); or A variation pattern of the inner or outer size in an axial direction of the member after quench-hardening is measured (step S1-2);

A difference in the inner or outer size of the member between before and after quench-hardening is calculated (step S2-1);

A quench-hardened distortion ratio is calculated on the basis of the difference and the first size (step S2-2);

The difference obtained by calculation in step S2-1 is compared with a difference obtained for a good quench-hardened member (step S3-1); or The axial direction variation pattern obtained in step S1-2 is compared with a predetermined axial direction variation pattern of an inner or outer size of a good quench-hardened member (step S3-2); or The quench-hardened distortion ratio obtained in step S2-2 is compared with a predetermined quench-hardened distortion ratio of a good quench-hardened member (step S3-3);

It is judged whether the quench-hardened depth of the member is acceptable or non-acceptable on the basis of whether the value compared in step S3-1, S3-2, or S3-3 is in a range of a predetermined allowable value for a good quench-hardened member (step S4).

Here, description will be made about induction hardening (high-frequency quench-hardening) on various parts.

FIGS. 3, 5 and 7 are a sectional view showing a hardened layer in the case where induction hardening (high-frequency quench-hardening) was carried out in the inner circumferential surface of an outer ring of a bearing, a sectional view showing a hardened layer in the case where quench-hardening was carried out in the inner circumferential surface of a cup-like matter, and a sectional view showing a hardened layer in the case where quench-hardening was carried out in the outer circumferential surface of a cylindrical member (shaft) respectively. In FIG. 3, A, B, and C respectively denote positions of the cylindrical member, in the axial direction, where a quench-hardened depth can be measured. In FIG. 3, a, b, and c respectively denote a depth of the quench-hardened layer at A, B, and C.

By this quench-hardening treatment, a hardened layer is formed in a metal surface to a depth of about several hundreds μm to over ten odd mm.

In this hardened layer (medium/high carbon steel), martensite transformation is generated to thereby form such a macro structure as shown in the right side ⅔ region in FIG. 4. This region is smaller in Vickers indentation (that is, harder) than a base region.

By the martensite transformation, the size of this quench-hardened layer is expanded by several % in comparison with that before the martensite transformation.

That is, in the case of the cup-like matter of FIG. 5 subjected to quench-hardening in its inner circumferential surface (under quench-hardening conditions: 93 kHz, 510 V, 830 A, 428 kW/sec, S53C, water quench-hardening), the quantity of change in inner size and the depth of quench-hardened layer exhibit substantially linear correspondence therebetween as shown in FIG. 6.

Similarly in the case of the shaft member of FIG. 7 subjected to quench-hardening in its outer circumferential surface, the quantity of change in outer size and the depth of quench-hardened layer exhibit substantially linear correspondence therebetween as shown in FIG. 8.

Accordingly, if the inner or outer size of a member is measured before and after quench-hardening, it is possible to estimate the quench-hardened layer accurately from the quantity of change in the size. If this quantity of change in the size is compared with a numerical value of a standard good member quench-hardened preferably, the quality of the quench-hardened layer can be judged easily.

That is, the correspondences are established as follows:

Shortage in quench-hardened depth→Too small change in size

Excess in quench-hardened depth→Too large change in size

Insufficient cooling→Small or too small change in size

Not-yet-quench-hardening (flesh member)→No change in size.

Further, in the testing method using the above relation, the inner/outer size measuring technique is established surely so that the measurement can be carried out accurately and quickly, and the measurement and judgement can be performed through non-destructive inspection. Accordingly, it becomes possible to perform 100% inspection to thereby raise assurance in quality control.

In the case of the example of FIG. 9 in which partial quench-hardening is carried out in the outer circumferential surface, if the distribution of the quantity of change in outer size is plotted correspondingly to the position from the center portion of quench-hardening portion 30, it is possible to obtain a view showing quench-hardening state patterns in the cases of too little, too much and proper quench-hardening conditions respectively as shown in FIG. 10. Similarly in the case of the example in which partial quench-hardening is carried out in the inner circumferential surface, it is possible to obtain a view showing quench-hardening state patterns as shown in FIG. 12. In FIGS. 10 and 12, the triangles indicate a curve for an insufficiently quench-hardened region, the circles indicate a properly quench-hardened region, and the squares indicate a curve for an excessively quench-hardened region. By using such characters, it is possible to check the quality of the quench-hardening pattern through non-destructive inspection.

The proper value of the quench-hardened depth and the quantity of change in size in quench-hardening vary correspondingly to the diameter or thickness (in the case of a hollow member) of parts. When a character region of good parts is to be determined, it is therefore preferable to perform comparison after the above value and quantity are standardized with respect to the diameter (thickness) of the parts so as to be converted into a ratio quench-hardened depth and a distortion in outer size.

That is, if judgement is made by setting the working curve of FIG. 13 representing the correspondence between the ratio of quench-hardened depth and the distortion in outer size in the case of the cup-like parts of FIG. 5, and by setting the working curve of FIG. 14 representing the correspondence between the ratio of quench-hardened depth and the distortion in outer size in the case of the shaft-like parts of FIG. 7, a unified judgement algorithm can be used even if there are variations at an extent in size or shape of the parts to be inspected.

In the cases of the sleeve-shaped parts shown in FIG. 3, the cup-like parts shown in FIG. 5, and the cylindrical member shown in FIG. 11, each having an inner circumferential surface which is subjected to a quench-hardening and has quench-hardened portion 30, an example of a method according to the present invention for judging a quality (good/unacceptable) of the depth of the quench-hardening layer on the basis of the quantity of change of the inner size is explained above. However, the method of the present invention is also applicable for judging the quality on the basis of the quantity of change of an outer size as well as the inner size.

In addition, similar to the previous example, when the judgement can be carried out on the basis of the application of the algorithm (for example, the ratio of change in volume or the quantity of distortion) in such a manner that a relationship between the outer size distortion (ΔD/D) and the quench-hardened depth ratio (d/t) can be judged on the basis of a relationship between the outer size distortion and a quench-hardened depth ratio as shown in FIG. 13, where ΔD is directed to a quantity of change of outer size, D is directed to an outer size, t is directed to a thickness, and d is directed to a quench-hardened depth.

Namely, the quench-hardened layer are expanded by martensite transformation generated therein by the quench-hardening, so that the size of the parts is changed. In the present invention, the quantity of change of the size of the object to be inspected is compared with a predetermined standard value for judging that the quantity of change is disposed either in the range of a good-product or in the range of an unacceptable product, so that the method of the present invention is not limited by a process for measuring a change of size based on outer size, inner size, a distance in an axial direction, or the like. Accordingly, the judgement of the present invention can be operated at the most suitable position in accordance with a configuration or size of the object to be inspected.

In particular, when the object to be inspected is a small sized sleeve member, it is preferable to conduct the judgement on the basis of the measurement of the outer size (an outer diameter, an distance in the axial direction or the like), due to the fact that an insertion or an incident light of a measuring element, a length measuring instrument, a length measuring wave, or a length measuring light is limited.

In the above embodiment, the quench-hardened work W is mounted on the work-size measurement apparatus 100 and the outer size of the work W is measured by means of the dial gauge 4. At this time, the measurement position of the work W is properly adjusted by means of the positioning jig 2 and the ball screw 3.

Next, the outer size before quench-hardening is subtracted from the measured outer size after quench-hardening to obtain a change in size. The value of the change in size is divided by the outer size before quench-hardening to obtain a quantity of distortion in outer size. The quench-hardened depth corresponding to the quantity of distortion in outer size is judged on the basis of a characteristic diagram determined for good parts in advance to thereby judge whether the quench-hardened depth is in a range of proper value.

The above testing method can be made through non-destructive inspection and can be performed rapidly, and it is therefore possible to measure all the products through 100% inspection if necessary.

Further, description has been made above about the cases in which the products are made of medium or high carbon steel. It is however a matter of course that the testing method of the present invention can be applied even to through hardened products.

According to the present invention, the method of testing quench-hardening in which a quantity of change in size, between before and after quench-hardening, of a hollow or solid member subjected to quench-hardening treatment in at least one of inner and outer circumferential surfaces of the member is measured, and the measured quantity of change is compared with a pre-measured quantity of change in size of a good member or a value obtained by a comparative calculating operation in accordance with a predetermined algorithm on the basis of the measure quantity of change is compared with a predetermined value of the good member to thereby judge the state of quench-hardening.

Accordingly, the depth of the quench-hardened layer and the quality of the quench-hardening pattern can be judged even in the case of parts complicated or hollow in shape.

Furthermore, since the judgement can be made rapidly through non-destructive inspection, it is possible to perform 100% inspection on quench-hardened parts and the invention has an excellent effect in that the contents of quality control can be improved extremely.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of testing quench-hardening, comprising the steps of:

measuring a first size of an annular member before a quench-hardening treatment with respect to at least one of an inner and outer surface of said member;

measuring a second size of said member after a quench-hardening treatment of said at least one of an inner and outer surface of said member;

calculating a difference in said member between said first size and said second size; and judging the state of quench-hardening in said member by comparing the difference in said member with a pre-determined difference obtained from a good quench-hardened member.

2. A method of testing quench-hardening, comprising the steps of:

measuring quantities of change of dimensions of a member at a plurality of points along the axial direction of said member to obtain a size variation pattern due to micro structural change in an axial direction of said member after a quench-hardening treatment; and judging the state of quench-hardening in said member by comparing said measured size variation pattern with a predetermined size variation pattern due to micro structural change in an axial direction of a good quench-hardened member.

3. A method of testing quench-hardening, comprising the steps of:

measuring a first size of an annular member before a quench-hardening treatment with respect to at least one of an inner and outer surface of said member;

measuring a second size of said member after a quench-hardening treatment of said at least one of an inner and outer surface of said member;

first calculating a difference between said first size and said second size;

second calculating a quench-hardened distortion ratio by dividing said difference by said first size of said member; and judging the state of quench-hardening in said member by deciding whether the calculated distortion ratio of said member is within a predetermined range of a distortion ratio of a good quench-hardened member.

4. A quench-hardening state inspecting apparatus for judging a state of the quench-hardening of a member subjected to quench-hardening treatment in at least one of inner and outer surface of said member, comprising:

first measuring means for measuring a first size of an annular member before a quench-hardening treatment with respect to at least one of an inner and outer surface of said member;

second measuring means for measuring a second size of said member after a quench-hardening treatment of at least said one of an inner and outer surface of said member;

calculating means for determining a difference in said member between said first size and said second size; and judging means for judging the state of quench-hardening in said member by comparing the difference in said member with a predetermined difference obtained from a good quench-hardened member.

5. A quench-hardening state inspecting apparatus for judging a state of the quench-hardening of a member subjected to quench-hardening treatment in at least one of inner and outer surface of said member, comprising:

measuring means for measuring quantities of change of dimensions of a member at a plurality of points along the axial direction of said member to obtain a size variation pattern due to micro structural change in an axial direction of said member after the quench-hardening treatment, and judging means for judging the state of quench-hardening in said member by comparing said measured size variation pattern with a predetermined size variation pattern due to micro structural change in an axial direction of a good quench-hardened member.

6. A quench-hardening state inspecting apparatus for judging a state of the quench-hardening of a member subjected to a quench-hardening treatment in at least one of inner and outer surface of said member, comprising:

first measuring means for measuring a first size of an annular member before a quench-hardening treatment with respect to at least one of an inner and outer surface of said member;

second measuring means for measuring a second size of said member after a quench-hardening treatment of said at least one of an inner and outer surface of said member;

first calculating means for determining a difference between said first size and said second size;

second calculating means for calculating a quench-hardened distortion ratio by dividing said difference by said first size of said member; and judging means for judging the state of quench-hardening in said member by deciding whether the calculated distortion ratio of said member is within a predetermined range of a distortion ratio of a good quench-hardened member.

* * * * *